United States Patent [19]

Reinecke

[11] 4,026,391

[45] May 31, 1977

[54] FLUID PRESSURE OPERATED DISC BRAKE WITH PISTON EXPANSION MEANS TO COMPENSATE FOR BRAKE SHOE WEAR

[75] Inventor: Erich Reinecke, Beinhorn, Germany

[73] Assignee: WABCO Westinghouse GmbH, Hannover, Germany

[22] Filed: Feb. 9, 1976

[21] Appl. No.: 656,439

[30] Foreign Application Priority Data

Feb. 28, 1975 Germany .................. 2508771

[52] U.S. Cl. .................. 188/71.9; 188/196 BA
[51] Int. Cl.² .................. F16D 65/56
[58] Field of Search .......... 188/71.9, 196 D, 196 F, 188/196 BA

[56] References Cited
UNITED STATES PATENTS

| 3,292,740 | 12/1966 | Swift | 188/71.9 |
| 3,550,732 | 12/1970 | Beller | 188/196 D |
| 3,811,540 | 5/1974 | Knapp et al. | 188/196 D |

*Primary Examiner*—Duane A. Reger
*Attorney, Agent, or Firm*—R. W. McIntire, Jr.

[57] ABSTRACT

A disc brake unit embodying a pair of adjusting members confined in an opening between the application piston and a thrust member carried by the application piston for transmitting the brake application forces to the disc brake shoes. The adjusting members are contiguous along their adjacent frontal faces from which projects a plurality of inclined surfaces that coact to expand the adjusting members axially when relative rotation is imparted to the adjusting members, as by springs acting peripherally therebetween. The springs are only able to effect such rotation of the adjusting members when the space in which these members are confined is enlarged due to the thrust member being held stationary by a cramp ring when the piston is returned to release position following a brake application during which brake shoe wear occurred.

9 Claims, 6 Drawing Figures

4,026,391

FLUID PRESSURE OPERATED DISC BRAKE WITH PISTON EXPANSION MEANS TO COMPENSATE FOR BRAKE SHOE WEAR

BACKGROUND OF THE INVENTION

The present invention relates to fluid pressure operated disc brakes and particularly to disc brakes for an air brake equipped vehicle such as relatively large sized trucks and buses, for example.

Disc brakes are commonly used in today's passenger cars and lighter commercial type vehicles, which have hydraulic or hydraulic/pneumatic brakes. Consequently, any increase in the brake cylinder volume due to increased piston stroke resulting from brake shoe wear is compensated without requiring a mechanical slack adjuster by drawing additional hydraulic fluid from a relatively small storage reservoir, which is a part of the closed hydraulic system. A brake system of this type is ideal in that no additional expense or space is required to accommodate a slack adjuster.

In comtemplating the application of disc brakes to larger type commercial vehicles, however, consideration must be given to the fact that these vehicles typically employ air brakes. This creates the problem of compensating brake shoe wear, which requires either a larger air tank to accommodate the additional brake cylinder volume and/or more efficient compressor. Neither of these choices is practical because of limited space for a larger air tank and the additional expense of a compressor having the necessary capacity to handle the air requirement. An alternative choice, of course, would be to resort to a mechanical type slack adjuster to maintain the piston stroke and thus the effective brake cylinder volume constant as brake shoe wear progresses.

SUMMARY OF THE INVENTION

The principal object of the present invention, therefore, is to provide a pneumatically actuated disc brake unit having a mechanical slack adjuster which is simple in construction, low in cost and compact in design.

An extension of this object is that of providing a slack adjusting mechanism that is housed within the brake cylinder piston and operates by expanding axially to extend the distance between the piston and the thrust member that forms part of the piston as the brake shoe wear progresses.

It is still a further object of the invention to provide the slack adjusting mechanism in the form of independently rotatable members having their adjacent frontal faces formed with coacting inclined surfaces for translating their rotary motion into axial displacement therebetween in such sense as to lengthen the axial dimension of the piston with which the slack adjusting mechanism is associated.

In carrying out these objects, there is provided a disc brake assembly comprising a pair of spaced-apart disc rotor members that are secured to the vehicle wheel hub for rotation therewith and a brake cylinder unit disposed between the disc members and supported by brake bands suspended from a stationary support bracket mounted on the axle of the vehicle, which may be a commercial vehicle whose brakes are air actuated, for example. At each brake band there is connected a shoe that is moved into and out of engagement with a respective one of the disc members to apply and release the brakes according to the supply and release of the brake cylinder actuating pressure.

The invention resides in a slack adjusting mechanism and its arrangement within an articulated brake cylinder piston whose one segment is subject to the actuating force and whose other segment abuts the brake band of the brake shoe to transmit the actuating force to the brake disc during a brake application. The slack adjusting mechanism operates during a brake release by expanding in an axial direction to increase the axial dimension of the articulated piston according to the brake shoe wear during each brake application. A release spring retracts the one piston segment, which carries with it the other segment due to a friction connection therebetween until the other segment picks up a limit stop when the piston travel has exceeded a predetermined amount corresponding to the desired brake shoe/disc clearance. The friction connection is overcome by continued retraction of the one piston segment relative to the now stationary other segment when brake shoe wear has occurred, thereby increasing the axial space between the piston segments. The slack adjusting mechanism is confined within this space between the piston segments and comprises a pair of independently rotatable members whose adjacent frontal faces are contiguous, being formed with interfitting inclined surfaces which cooperate to increase the axial dimension of the adjusting mechanism to take up the increased space created between the piston segments when at least one member of the adjusting device is rotated relative to the other by a spring acting between the members. In this manner, the axial dimension of the brake cylinder piston is varied with brake shoe wear to maintain a predetermined brake cylinder volume having a constant air requirement for a given degree of brake application throughout the range of brake shoe wear.

Other objects and attendant advantages of the invention will become apparent from the following more detailed description when taken with the attached drawings in which.

DESCRIPTION AND OPERATION

Figure 1:
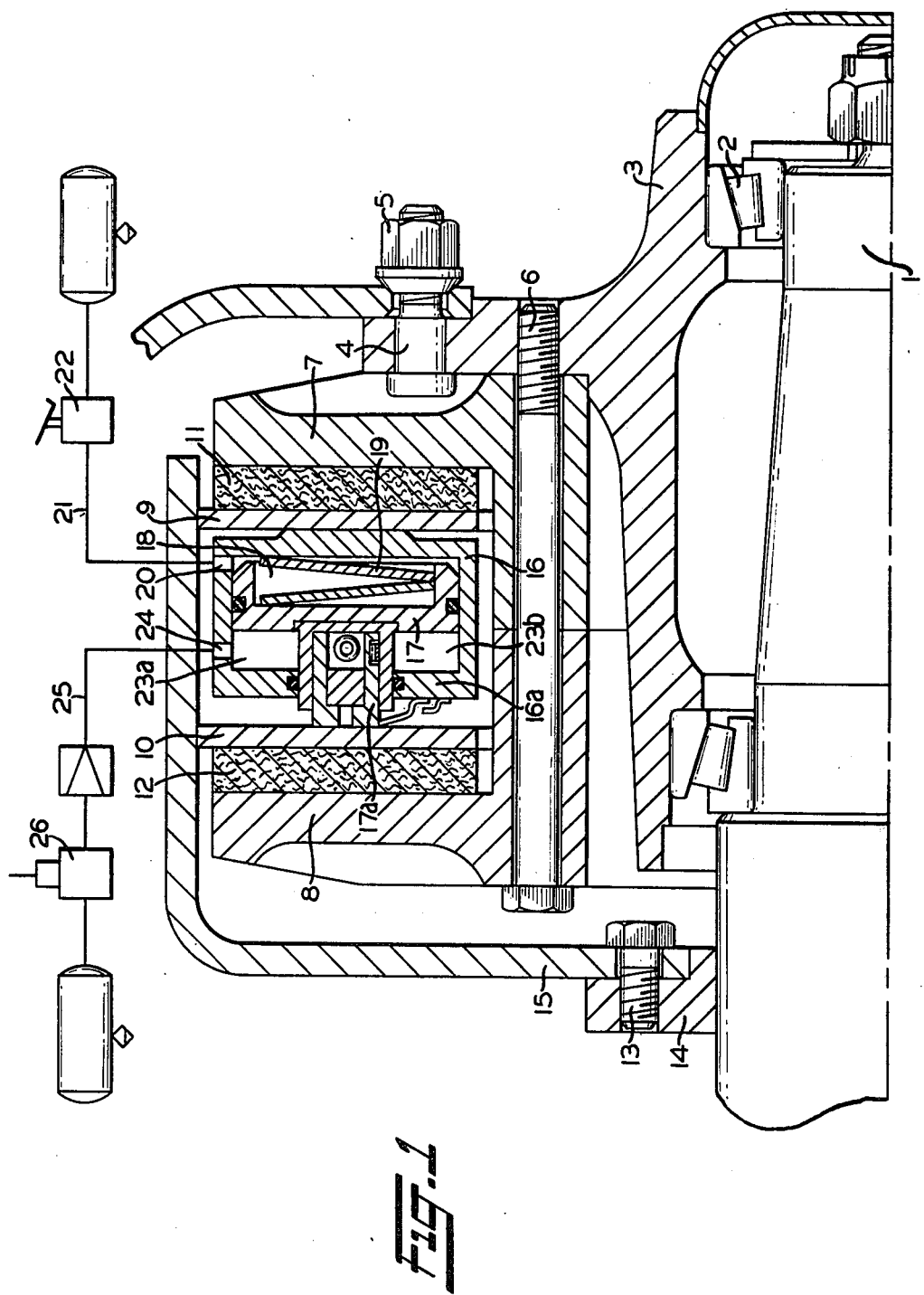
FIG. 1 is a section view taken through a vehicle wheel hub and axle, showing diagrammatically a disc brake unit including a brake cylinder device having an articulated operating piston with which there is arranged a slack adjusting mechanism to automatically compensate brake shoe wear.

By way of explaining the general arrangement of the invention, reference may be had to FIG. 1 wherein there is shown a vehicle axle 1 provided with bearings 2 on which a wheel hub 3 is rotatably mounted for carrying a wheel that is secured by wheel studs 4 and nuts 5. A plurality of screws 6 pass through a pair of brake discs 7 and 8 of a disc brake assembly and are screw threaded into wheel hub 3 to secure brake discs 7, 8 for rotation with the wheel, hub and axle assembly. The non-rotatable parts of the brake assembly consist of brake bands 9, 10 to which friction brake shoes 11, 12 are attached for engagement with the spaced-apart machined faces of brake discs 7, 8 during braking. Mounted by screws 13 to a flange 14 of axle 1 is a support bracket 15 from which brake bands 9, 10 are suspended so as to be axially movable between the machined faces of brake discs 7, 8.

The brake actuating device of the brake assembly is located between brake bands 9, 10 and consists of an annular brake cylinder 16 suitably connected to brake band 9 and an axially movable, actuating piston 17 that operates in cylinder 16. Actuating piston 17 comprises a thrust member 17a that operates in an axial bore formed in the stem of piston 17 and is suitably connected to brake band 10. A chamber 18, which is located between the bottom of annular cylinder 16 and actuating piston 17, and wherein there may be disposed a spring 19, is communicated by a port connection 20 and line 21 with a brake valve device 22 of the vehicle. An annular chamber 23a/23b between piston 17 and cover 16a of cylinder 16 is communicated by way of port connection 24 and line 25 with a handbrake valve device 26.

In brake release position, fluid pressure is supplied by handbrake valve 26 to chamber 23a/23b where it acts on piston 17 to overcome the force of spring 19 acting on the piston.

Concurrently, fluid pressure in spring chamber 18 is vented via service brake valve 22 and piston 17 is held in brake release position.

In order to make a service brake application, brake valve device 22 is operated in a conventional manner to supply air to chamber 18 via line 21 and port connection 20. As pressure increases in chamber 18, piston 17 acts through thrust ring 17a and brake band 10 to force brake shoe 12 into engagement with brake disc 8, while cylinder 16 acts through brake band 9 to force brake shoe 11 into engagement with brake disc 7.

A handbrake application is accomplished by operating handbrake valve 26 to release air from chamber 23a/23b to allow spring 19 to apply the brakes in a similar manner as provided by the application of air to chamber 18 in making a service brake application.

Figure 2:
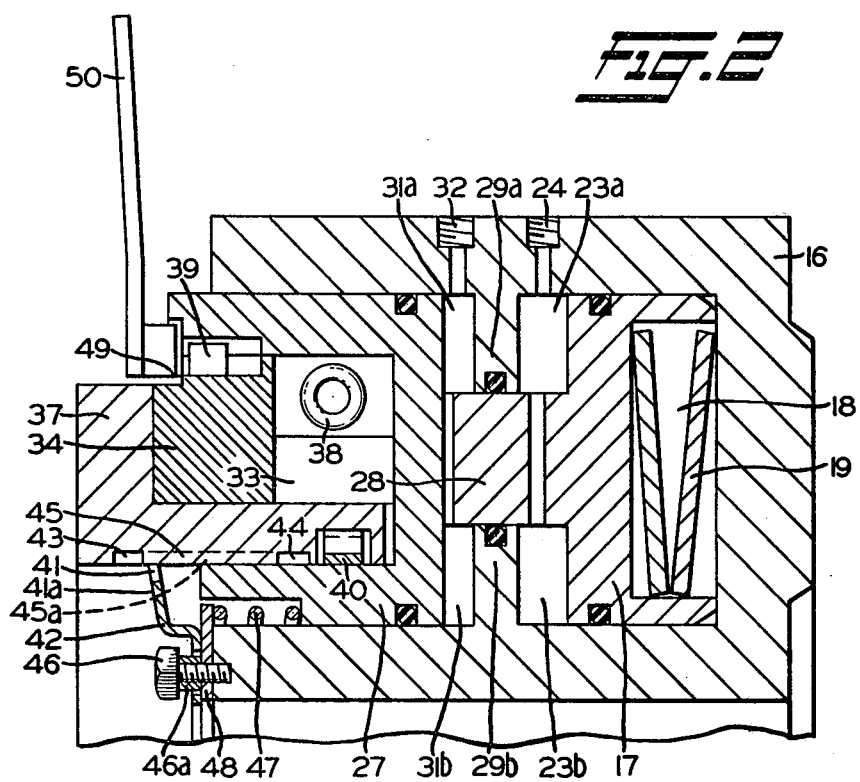
FIG. 2 is an enlarged view of the brake cylinder device of FIG. 1 showing the slack adjusting mechanism of the brake cylinder piston in greater detail.

More specifically, there is shown in FIG. 2 a brake actuating device differing from that of FIG. 1 in that the annular cylinder 16 contains two axially movable, annular pistons 17 and 27. The annular chamber defined by pistons 17 and 27, and into which extends a stem 28 of piston 17, is divided by a separating wall 29a/29b to form annular chambers 23a/23b and 31a/31b. Spring 19 is disposed in chamber 18 formed between the end wall of annular cylinder 16 and piston 17. Chamber 23a/23b is communicated with handbrake valve 26 via port connection 24 and chamber 31a/31b is communicated with brake valve 22 via port connection 32.

Figure 3:
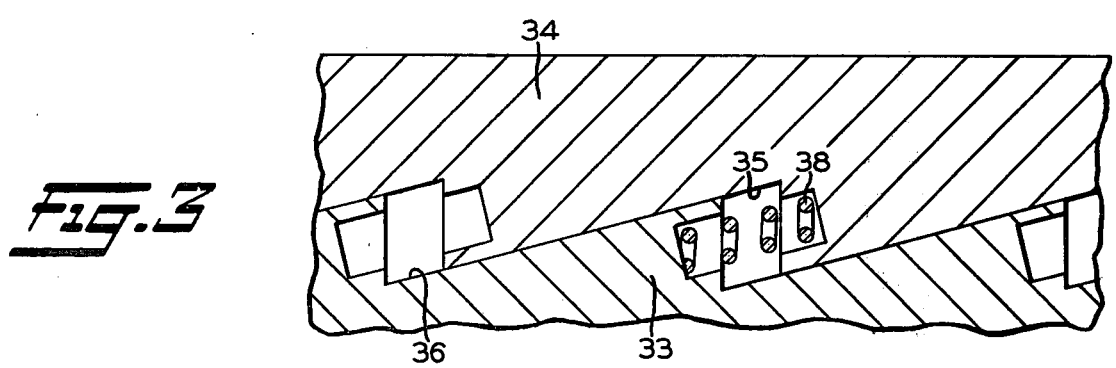
FIG. 3 is a partial section view of the slack adjusting mechanism showing the inclined planes along the adjacent frontal faces of the respective members comprising the slack adjusting mechanism.

Construction of the automatic adjusting mechanism according to the invention is described with reference to FIG. 2 showing the slack adjusting mechanism disposed within a thrust ring 37 (corresponding to thrust ring 17a of FIG. 1) that is in turn carried within the annular piston 27. The slack adjusting mechanism includes a pair of independently rotatable annular adjusting members 33, 34, which fit between the base of the piston cavity and the end of thrust ring 37. Although not shown in FIG. 2, thrust ring 37 is connected to brake band 10 and cylinder 16 is connected to brake band 9, as shown in FIG. 1. Adjusting members 33, 34 are each provided at their adjacent frontal faces with a series of inclined surfaces 35 and 36, as shown in FIG. 3. Also shown in FIG. 3 are springs 38 housed in cavities formed between adjacent end faces formed by the inclined surfaces of the respective adjusting ring members. These springs act peripherally to urge the respective adjusting ring members to rotate in opposite directions.

Figure 4:
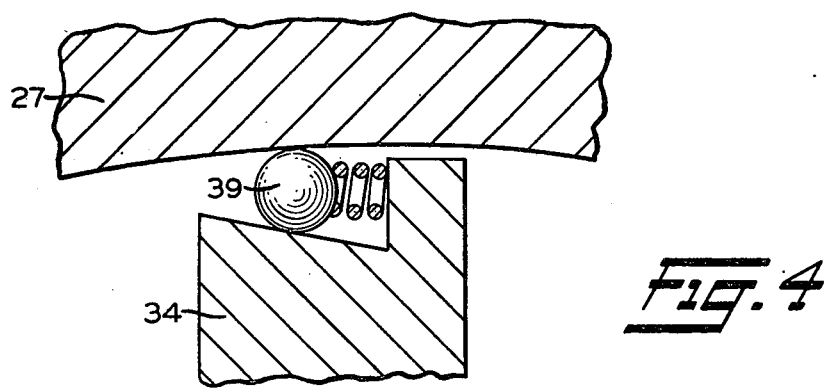
FIG. 4 is a partial section view showing a locking device to prevent rotation of one of the respective members relative to the other in a direction to axially contract the slack adjusting mechanism.

A locking device 39, shown in FIG. 4, comprises a spring loaded, cylindrical bearing, which is provided between adjusting member 34 and piston 27 to prevent rotation of adjusting member 34 in a direction opposite the force exerted thereon by springs 38. These springs are capable of effecting rotation of adjusting member 33 relative to adjusting member 34 to effect expansion of the slack adjusting mechanism by reason of the relative movement of the inclined surfaces 35 and 36 of the respective members 34 and 33.

Figure 5:
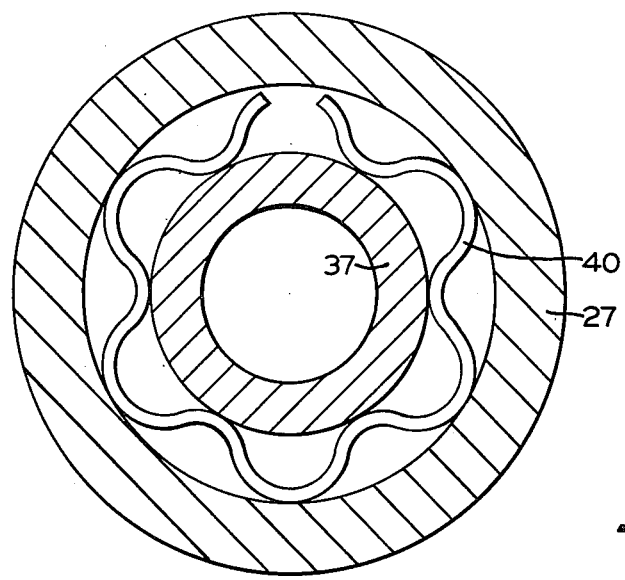
FIG. 5 is a section view showing one form of friction ring between the articulated piston segments.

A friction ring 40 having a preformed corrugated shape, as shown in FIG. 5, is mounted in an annular recess of thrust ring 37 so as to be somewhat compressed radially between thrust ring 37 and piston 27 when assembled in order to offer resistance to both axial and rotational movement of thrust ring 37 relative to piston 27.

Figure 6:
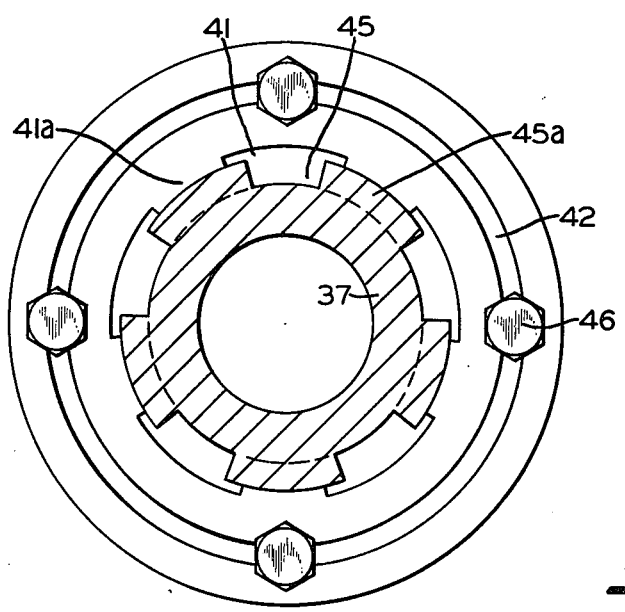
FIG. 6 is a section view showing a clamping ring acting on the external diameter of one segment of the articulated piston to restrain movement thereof with the other segment beyond a predetermined point during a brake release.

As shown in FIG. 6, the periphery of thrust ring 37 is formed with spaced-apart, annular grooves 43 and 44 that are interconnected by a series of axial grooves 45. The fingers 41a of a cramp ring 42 are separated by spaces 41 and rest on the lands 45a formed by grooves 45 with some degree of tension and at such an angle as to permit substantially unrestricted movement of thrust ring 37 and consequently piston 27 in a brake application direction and to lock thrust ring 37 against movement in the brake release direction. Screws 46 are fixed to cylinder 16 with a spacer 46a for each screw that defines the distance the screw head is spaced apart from cylinder 16. A return spring 47 is retained in an annular cavity encircling cylinder 16 and is held in place by a retaining ring 48 that is secured over the spring cavity by screws 46 and spacers 46a. An annular cramp ring 42 is secured to cylinder 16 coaxial with thrust ring 37 by screws 46 and spacers 46a, which permit limited axial movement of the cramp ring between the cylinder and spaced-apart heads of screws 46. A groove 49 in adjusting member 34 accommodates a special tool 50 for rotating member 34 in a direction to contract the adjusting mechanism, provided locking device 39 has been removed or released.

The operation of the automatic adjusting means according to the invention is now described with reference to the brake cylinder device 16 of FIG. 2.

As described with referecne to FIG. 1, the supply of air from brake valve 22 activates the service brake system, while the release of air by the handbrake valve 26 allows spring 19 to initiate a handbrake application.

During a service brake application, air is supplied to chamber 31a/31b of cylinder 16 to force piston 27 leftward, while air is also maintained in chamber 23a/23b by handbrake valve 26 to prevent spring 19 from concurrently acting on piston 27 via piston 17 and stem 28. The adjusting device comprising adjusting members 33 and 34, whose inclined frontal faces are in contact, transmits the brake force from piston 27 to thrust ring 37 and thence to brake band 10 (FIG 1) to force the brake shoes against brake disc 8 (FIG. 1). The reaction force in turn acts through cylinder 16 and brake band 9 to force brake shoe 11 into braking engagement with disc 7. During this leftward movement of piston 27, a light drag is transmitted from thrust ring 37 to cramp ring 42 via fingers 41a to also cause cramp ring 42 to be moved leftward with piston 27 and thrust ring 37.

In the event brake shoe wear progresses beyond a certain amount, the stroke of piston 27 during brake application will increase enough to cause cramp ring 42 to be moved against the limit stop provided by the head of screw 46, which prevents further movement of the cramp ring. Continued leftward movement of piston 27 causes thrust member 37 to slide over stationary fingers 41a.

During subsequent brake release, the air pressure in chamber 31a/31b is released, allowing return spring 47 to force piston 27 rightward, as viewed in FIG. 2. The friction connection between piston 27 and thrust ring 37 provided by friction ring 40 is now effective to pull thrust member 37 rightward with piston 27 to retract the brake shoes from the brake discs. Cramp ring 42, by reason of the drag imparted via fingers 41a, also moves rightward until it engages washer 48. It will be understood that the distance between the head of screws 46 and washer 48 defines the proper degree of brake shoe retraction to be obtained. From this point on, cramp ring 42 is prevented from movement with piston 27. Because of the angle at which fingers 41a of cramp ring 42 contact thrust ring 37, the cramp ring exerts sufficient holding force on the thrust ring to overcome its friction connection with piston 27, as provided by friction ring 40.

As piston 27 continues to move rightward toward brake release position relative to stationary thrust ring 37, the distance between these members increases so that adjusting members 33 and 34 become unloaded. Accordingly, springs 38, as seen in FIG. 3, become effective to rotate adjusting ring 33 in a direction which, due to the action of the inclined surfaces at the adjacent frontal interfaces of adjusting members 33 and 34, increases the axial dimension of the slack adjusting mechanism. This results in continuous engagement of the adjusting mechanism with both the piston 27 and thrust ring 37, as the distance between these members increases. This slack, of course, corresponds to the overtravel or excess piston stroke resulting from brake shoe wear, so that the slack adjusting mechanism, in taking up this additional slack, automatically compensates for brake shoe wear.

It will be appreciated now that in release position of piston 27, the friction ring 40 serves to prevent axial movement of thrust ring 37 under the influence of springs 38, which tend to effect rotation of adjusting member 34 in a direction to expand the slack adjusting mechanism. Thus, a predetermined spacing between the brake shoes and discs is preserved during brake release to prevent undesired rubbing therebetween when the vehicle is in motion so that maximum service life is realized for the brake shoes.

It will also be appreciated now that during a brake application, locking device 39 serves to positively prevent rotation of adjusting ring member 34 in the opposite direction, i.e., in a direction against springs 38 in which the slack adjusting mechanism would collapse or become contracted. The tendency for member 34 to rotate in a direction opposing springs 38 arises due to the angle of the inclined surfaces 35 and 36 imparting a turning moment on the respective adjusting members 33 and 34 in opposite directions when the adjusting mechanism is loaded during a brake application.

When it becomes necessary to change worn brake shoes, the operation can be accomplished more readily by contracting the expanded slack adjusting mechanism to provide ample clearance space in which to work. The expanded slack adjusting mechanism may be contracted by first loosening screws 46 to allow cramp ring 42 to be rotated by means of an annular slot aligned with screws 46 until fingers 41a are aligned with an axial groove 45. To accomplish this rotation of cramp ring 42, thrust ring 37 must be forced leftward until annular groove 44 of thrust ring 37 is aligned with fingers 41a to allow rotation of the cramp ring. Once cramp ring 42 is rotated so that fingers 41a are aligned with axial grooves 45, the gripping action of the cramp ring 42 on thrust ring 37 is eliminated, thereby permitting thrust ring 37 to be moved rightward relative to piston 27. To permit rightward movement of thrust ring 37 relative to piston 27, however, the slack adjusting mechanism must first be contracted. This is accomplished by removing or disengaging clamping device 39 to permit rotation of adjusting member 34 in a direction opposite the force exerted thereon by springs 38. A special tool 50 may be employed in groove 49 to effect this rotation of adjusting member 34 until the slack adjusting mechanism is fully contracted, thereby creating clearance space between thrust ring 37 and adjusting ring member 34. Air may now be supplied to chamber 31a/31b or alternatively discharged from chamber 23a/23b to force piston 27 toward application position. As piston 27 moves outward, the brake shoes are brought into contact with the braking discs and thrust ring 37 is compressed rightwardly into piston 27 to take up the clearance or slack between the thrust ring and adjusting member 34.

By subsequently releasing the brakes, spring 47 moves piston 27 back to release position, pulling thrust ring 37 with it by reason of friction ring 40, since the thrust ring is free to follow the piston through the complete release stroke in the absence of the cramp ring action. Accordingly, maximum contraction of the slack adjusting mechanism and thus full retraction of the brake shoes occurs to provide the space necessary to easily remove the worn brake shoes and replace them with new shoes.

Once the new shoes are in place, cramp ring 42 may be rotated until fingers 41a are restored to their normal position in friction contact with the lands between axial grooves 45 to restore the gripping ability of cramp ring 42. In the fully retracted position of thrust ring 37, fingers 41a are aligned with annular groove 43 to facilitate rotation of the cramp ring, which is subsequently secured by tightening screws 46, thereby concluding the procedure for changing brake shoes.

Having now described the invention what I claim as new and desire to secure by Letters Patent, is:

1. A fluid pressure operated disc brake unit having at least one brake shoe arranged to be actuated into friction braking engagement with a rotor member of the brake unit comprising:
   a. a brake cylinder device;
   b. an annular actuating piston operative in said brake cylinder device responsive to the supply of fluid pressure thereto to apply at least one brake shoe to the rotor member;
   c. a return spring acting on said actuating piston in a direction to move the piston to release position responsive to venting of the fluid pressure supplied thereto during a brake application;
   d. a thrust ring carried by said actuating piston for relative axial movement therewith, said thrust ring being engageable with said at least one brake shoe; and
   e. a slack adjusting mechanism operatively disposed between said actuating piston and said thrust ring comprising:
      i. a pair of adjusting members independently rotatable about an axis parallel to the axis of said actuating piston, said adjusting members each having a frontal face with an inclined portion projecting therefrom so as to interfit one with the other in contiguous relationship; and
      ii. spring means disposed in a space between the end walls formed by said inclined portions of the respective members for effecting rotation of one of said members relative to the other in a direction to cause said inclined portions to ride up on each other and thereby increase the axial dimension of said slack adjuster mechanism.

2. The disc brake unit as recited in claim 1 further comrpising:
   a. a cramp ring having a friction connection with the periphery of said thrust ring; and
   b. mounting means for securing said cramp ring to said brake cylinder for limited relative movement therewith through a predetermined distance, said friction connection providing for movement of said cramp ring with said thrust ring said predetermined distance in a brake application direction and providing for relative movement therebetween with movement of said thrust ring in the brake application direction in the absence of movement of said cramp ring, said friction connection further preventing relative movement between said thrust ring and said cramp ring during movement of said thrust ring in the opposite direction, whereby the return stroke of said thrust ring is limited to said predetermined distance.

3. The disc brake unit as recited in claim 2 wherein said mounting means comprises:
   a. said cramp ring having at least one opening near the outer periphery thereof;
   b. a screw for said at least one opening threadedly inserted therethrough into said brake cylinder at a mounting face thereof perpendicular to the axis of said thrust ring; and
   c. a spacer between the head of said screw and said brake cylinder mounting face over which said cramp ring is free to move between said screw head and said brake cylinder mounting face defining said predetermined distance.

4. The disc brake unit as recited in claim 1 further comprising friction means on said thrust ring engageable with said actuating piston for resisting relative movement therebetween in both an axial and a peripheral direction.

5. The disc brake unit as recited in claim 4 further characterized in that said friction means comprises an annular corrugated member disposed in an annular recess of said thrust ring so as to compressed radially for engagement with an annular bore of said actuating piston in which said thrust ring is carried when said piston and thrust ring are assembled.

6. The disc brake unit as recited in claim 1 further comprising locking means between said piston and said at least one of said adjusting members comprising said adjusting means for preventing rotation of said at least one of said adjusting members in a direction opposite the direction of rotation produced by said spring means.

7. The disc brake unit as recited in claim 6 further characterized in that said locking means is disengageable to permit manual rotation of said at least one adjusting member in a direction opposite the direction of rotation produced by said spring means.

8. The disc brake unit as recited in claim 2 further characterized in that :
   a. said thrust ring comprises at least one axial groove; and
   b. said cramp ring further comprises:
   i. at least one finger projecting therefrom for engagement with the periphery of said thrust ring adjacent said at least one axial groove thereof to provide said friction connection; and
   ii. an annular slot concurrent with said at least one opening to accommodate rotation of said cramp ring sufficient to align said at least one finger with said at least one axial groove and thereby disengage said friction connecton to permit movement of said thrust ring in said opposite direction.

9. The disc brake unit as recited in claim 8 wherein said thrust ring further includes a pair of spaced-apart annular grooves in which the opposite ends of said at least one axial groove terminate, said one finger being aligned with one and the other of said annular gooves in the new and worn condition of said brake shoes to facilitate said rotation of said cramp ring to engage and disengage said friction connection.

* * * * *

UNITED STATES PATENT OFFICE
CERTIFICATE OF CORRECTION

PATENT NO. : 4,026,391
DATED : May 31, 1977
INVENTOR(S) : Erich Reinecke

It is certified that error appears in the above-identified patent and that said Letters Patent are hereby corrected as shown below:

Column 8, line 53, after "said" insert --at least--

Signed and Sealed this

Thirteenth Day of December 1977

[SEAL]

Attest:

RUTH C. MASON
Attesting Officer

LUTRELLE F. PARKER
Acting Commissioner of Patents and Trademarks